US012664115B2

(12) United States Patent
Klacar et al.

(10) Patent No.: US 12,664,115 B2
(45) Date of Patent: Jun. 23, 2026

(54) SENSOR DATA OFFLOAD

(71) Applicant: Apple Inc., Cupertino, CA (US)

(72) Inventors: Neven Klacar, San Diego, CA (US); Ivo Zatloukal, Brno (CZ); Jeff Hane, Cupertino, CA (US); Karan Sanghi, San Carlos, CA (US); Patrick S. Harper, Oceanside, CA (US); Qing He, San Jose, CA (US); Sandeep Nair, San Jose, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 18/826,037

(22) Filed: Sep. 5, 2024

(65) Prior Publication Data

US 2026/0064614 A1    Mar. 5, 2026

(51) Int. Cl.
*G06F 13/38* (2006.01)

(52) U.S. Cl.
CPC .......... *G06F 13/38* (2013.01); *G06F 2213/40* (2013.01)

(58) Field of Classification Search
CPC .............................. G06F 13/38; G06F 2213/40
See application file for complete search history.

(56) References Cited

U.S. PATENT DOCUMENTS

| 9,246,617 B2* | 1/2016 | Caggioni .................. H04J 3/07 |
| 9,858,637 B1 | 1/2018 | Quach et al. |
| 10,453,500 B2* | 10/2019 | Frans ..................... G11C 5/063 |
| 10,511,696 B2* | 12/2019 | Mekuria ................ H04L 69/04 |
| 10,725,956 B2 | 7/2020 | Eilert et al. |
| 11,062,099 B1 | 7/2021 | Wagner et al. |
| 11,431,801 B2* | 8/2022 | Slik .................... H04L 67/5682 |
| 11,734,363 B2 | 8/2023 | Therene et al. |
| 11,838,363 B2* | 12/2023 | Slik ......................... G06F 3/065 |
| 2018/0121351 A1* | 5/2018 | Zhang ...................... G11C 8/06 |
| 2020/0250901 A1* | 8/2020 | Golov ................ B60R 21/0134 |
| 2022/0317918 A1* | 10/2022 | Golov .................. G06F 3/0656 |
| 2024/0135760 A1 | 4/2024 | Kippert et al. |
| 2024/0176536 A1* | 5/2024 | Wu ......................... G06F 3/061 |

FOREIGN PATENT DOCUMENTS

| CN | 106227899 A | 12/2016 |
| CN | 108957413 A | 12/2018 |
| CN | 118054880 A | 5/2024 |
| KR | 1020240019524 A | 2/2024 |

* cited by examiner

*Primary Examiner* — Henry Tsai
*Assistant Examiner* — Christopher A Daley
(74) *Attorney, Agent, or Firm* — DICKINSON WRIGHT RLLP

(57) ABSTRACT

A computer system for offloading sensor data processing is disclosed. An aggregation processor circuit may receive multiple data streams from corresponding ones of multiple sensors included in the computer system. The aggregation processor circuit may send a first portion of a particular data stream of the multiple data streams to a primary memory circuit for storage, and send a second portion of the particular data stream to a secondary memory circuit. The aggregation processor circuit may send the second portion of the particular data stream at a lower data rate than the first portion of the particular data stream.

20 Claims, 7 Drawing Sheets

SENSOR DATA OFFLOAD

FIELD

The described embodiments relate generally to computer systems and, more particularly, to techniques for using aggregation processors to offload sensor data.

BACKGROUND

Modern computer systems may include multiple circuit blocks designed to perform various functions. For example, such circuit blocks may include processors or processor cores configured to execute software or program instructions. Additionally, the circuit blocks may include memory circuits, mixed-signal circuits, analog circuits, and the like.

In addition to circuit blocks, some computer systems can also include sensors. Such sensors can be used to monitor acceleration, battery charge level, location via a global positioning system (GPS), ambient light, and the like. In many cases, sensors generate data that can be processed by processor or controller circuits. In some cases, sensors can generate an interrupt or other alert signal in response to the detection of a particular event.

DETAILED DESCRIPTION

Figure 1:
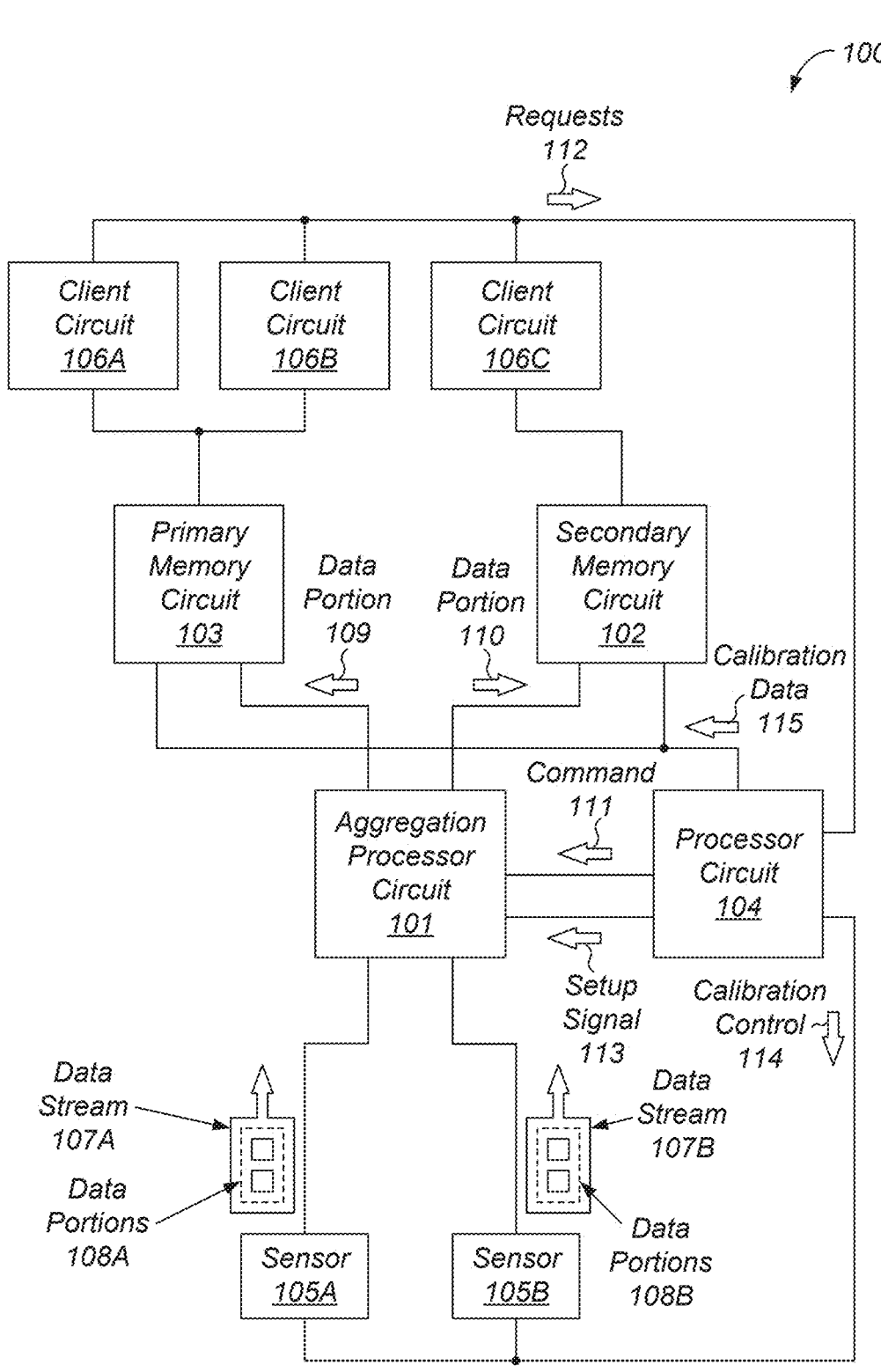
FIG. 1 is a block diagram depicting an embodiment of a computer system that includes sensors.

Computer systems may include multiple circuit blocks configured to perform specific functions. In some cases, computer systems may also include multiple sensors which can be configured to collect data on various environmental parameters associated with a given computer system. For example, a sensor may measure ambient light in the location of the computer system.

Data from sensors may be processed and used to adjust operating parameters of the computer system. For example, in response to a change in ambient light, the brightness of a display coupled to the computer system may be adjusted. Alternatively, a sensor may monitor a charge level of a battery coupled to the computer system. In response to a determination that the charge level is below a threshold level, a message may be generated to indicate the battery needs to be recharged.

To process data from sensors in a computer system, the data may be relayed to a central processor circuit. In some cases, such a central processor circuit may be implemented as a system-on-a-chip (or "SoC") that includes dedicated circuits (referred to as "clients") configured to process data from a corresponding sensor.

Data streams from sensors are often sent to a sensor processor circuit within the computer system. In some cases, the sensor processor circuit may be a low-power processor circuit, or may be an "always on" processor circuit that can remain active even when other portions of the computer system are in a sleep or power-down mode. The processor circuit may perform calibration and offset operations to the data streams prior to sending the processed data streams to various clients in the computer system. In some cases, however, performing such operations can increase the latency of the processor circuit to service other requests, thereby limiting performance. The added latency can be particularly problematic for virtual or augmented reality applications where the "motion to photon" latency needs to be minimized.

The embodiments illustrated in the drawings and described below provide techniques for using an aggregation processor circuit to divide sensor data streams into portions that can be sent to separate memory circuits for further processing. By dividing sensor data streams in such a fashion, the sensor processor circuit deals with only a portion of the data, thereby reducing its latency and improving system performance. Moreover, clients can read the sensor data directly from one of the memory circuits and can perform the calibration and offset operations when the data is consumed.

A block diagram of a computer system that includes sensors is depicted in FIG. 1. As illustrated, computer system 100 includes aggregation processor circuit 101, secondary memory circuit 102, primary memory circuit 103, processor circuit 104, sensors 105A-105B, and client circuits 106A-106C.

Primary memory circuit 103 and secondary memory circuit 102 are coupled to aggregation processor circuit 101. Additionally, aggregation processor circuit 101 is coupled to processor circuit 104 and sensors 105A-105B. Although only two sensors are depicted in the embodiment of FIG. 1, in other embodiments, any suitable number of sensors may be employed.

Sensors 105A-105B are configured to measure respective environmental conditions of computer system 100, or characteristics of a peripheral device coupled to computer system 100, and generate data streams 107A and 107B, respectively. For example, in some embodiments, sensor 105A may be configured to measure ambient light levels where computer system 100 is located. In other embodiments, sensor 105B may be configured to measure a charge level of a battery (not pictured) supplying power to computer system 100.

In various embodiments, data streams 107A and 107B include respective data portions 108A and 108B. In some cases, the data portions may include raw sensor data as well as calibration and offset data provided by the corresponding sensor.

Aggregation processor circuit 101 is configured to receive data streams 107A-107B from sensors 105A-105B, respectively. In various embodiments, aggregation processor circuit 101 is further configured to send, at a first data rate, data portion 109 of data portions 108A to primary memory circuit 103. Aggregation processor circuit 101 is further configured to send, at a second data rate, data portion 110 of data portions 108A to secondary memory circuit 102.

Although aggregation processor circuit 101 is depicted as combining data portions 108A and 108B into a single data stream, in other embodiments, aggregation processor circuit 101 may generate multiple data streams. In various embodiments, the number of data streams and the rate of the data streams may be based on rate requirements for different clients. For example, client circuit 106A may need data more quickly than client circuit 106B. In such a case, aggregation processor circuit 101 may generate two different data streams so that the higher data needs of client circuit 106A can be met.

In various embodiments, aggregation processor circuit 101 is also configured to store the first portion of data portions 108B at a first address location in primary memory circuit 103. Additionally, aggregation processor circuit 101 may be configured to store a different portion of data portions 108B in a second address location in primary memory circuit 103.

Primary memory circuit 103 may be implemented as one or more dynamic random-access memory (DRAM) circuits, static random-access memory (SRAM) circuits, or any other suitable memory circuit. In a similar fashion, secondary memory circuit 102 can be implemented using one or more DRAM or SRAM circuits.

Processor circuit 104 is configured to retrieve data portion 110 from secondary memory circuit 102. In various embodiments, processor circuit 104 may be configured to determine calibration and offset information using data portion 110, and store calibration data 115 at a third address location in primary memory circuit 103. In some embodiments, processor circuit 104 may be further configured to additionally store calibration data 115 in secondary memory circuit 102. As described below, processor circuit 104 may be continuously updating calibration data 115 and making it available in primary memory circuit 103 and secondary memory circuit 102 for any of client circuits 106A-106C to access and use.

In other embodiments, processor circuit 104 is configured to send command 111 to aggregation processor circuit 101. In various embodiments, command 111 may include a command or instruction for aggregation processor circuit 101 to execute. In other embodiments, command 111 may include a command or instruction for aggregation processor circuit 101 to relay to one of sensors 105A-105B.

In some embodiments, processor circuit 104 may be configured to generate calibration control 114. In response to receiving calibration control 114, sensors 105A and 105B may perform one or more calibration operations and provide results of the one or more calibration operations in data streams 107A and 107B. Processor circuit 104 may, in different embodiments, activate calibration control 114 at regular intervals, or in response to environmental changes such as temperature, and the like.

As described above, aggregation processor circuit 101 may combine data streams 107A and 107B in different ways. In some embodiments, how aggregation processor circuit 101 combines data streams 107A and 107B may be controlled by processor circuit 104. In such cases, processor circuit 104 may be configured to receive requests 112 from client circuits 106A-106C and, based on requests 112, generate setup signal 113. In various embodiments, requests 112 may include information indicative of a desired data rate requirement for client circuits 106A-106C. Aggregation processor circuit 101 may, in some embodiments, use setup signal 113 to determine how to combine data streams 107A and 107B.

It is noted that one or more of the functions that processor circuit 104 is configured to perform may be performed by different processor circuits (not shown). In various embodiments, processor circuit 104 may be implemented using a general-purpose processor circuit configured to execute software or program instructions. In other embodiments, processor circuit 104 may be implemented using a microcontroller or any other suitable combination of sequential and combinatorial logic circuits.

Client circuits 106A-106B are configured to retrieve raw data associated with a particular sensor of sensors 105A-105B from primary memory circuit 103. In a similar fashion, client circuit 106C is configured to retrieve different raw data from a different sensor of sensors 105A-105B from secondary memory circuit 102. In various embodiments, client circuits 106A-106B are also configured to retrieve calibration and offset information associated with the particular sensor from primary memory circuit 103, and apply the calibration and offset information to the raw data. In a similar fashion, client circuit 106C is configured to retrieve calibration and offset data associated with the different raw data from secondary memory circuit 102, and apply the calibration and offset information to the different raw data.

In some cases, a particular one of client circuits 106A-106B may consume data from a particular one of sensors 105A-105B at a lower rate that aggregation processor circuit 101 stores the data into primary memory circuit 103. In such cases, the particular one of client circuits 106A-106B may skip portions of the data in a process referred to as "down sampling." In some embodiments, the rate at which the particular one of clients 106A-106B retrieves data from primary memory circuit 103A may be dynamically changed during operation. For example, when the particular one of client circuits 106A-106B is in a sleep or other low-power mode, the data may be retrieved at a lower rate than when the particular one of client circuits 106A-106B is in an active or high-power mode.

Although different ones of client circuits 106A-106C are show as being connected to a single one of primary memory circuit 103 or secondary memory circuit 102, in other embodiments, any of client circuits 106A-106C may be connected to both primary memory circuit 103 and secondary memory circuit 102. In such cases, a particular client circuit of client circuits 106A-106C connected to both primary memory circuit 103 and secondary memory circuit 102 may be configured to retrieve a first stream of data from primary memory circuit 103 at a first data rate, and receive a second stream of data from secondary memory circuit 103 at a second data rate that is lower than the first data rate.

It is noted that, in various embodiments, aggregation processor circuit 101, processor circuit 104, secondary memory circuit 102, and client circuits 106A-106B may be located on a common integrated circuit or system-on-a-chip or "SoC." In such cases, primary memory circuit 103 and sensors 105A-105B may be located elsewhere within computer system 100.

Figure 2:
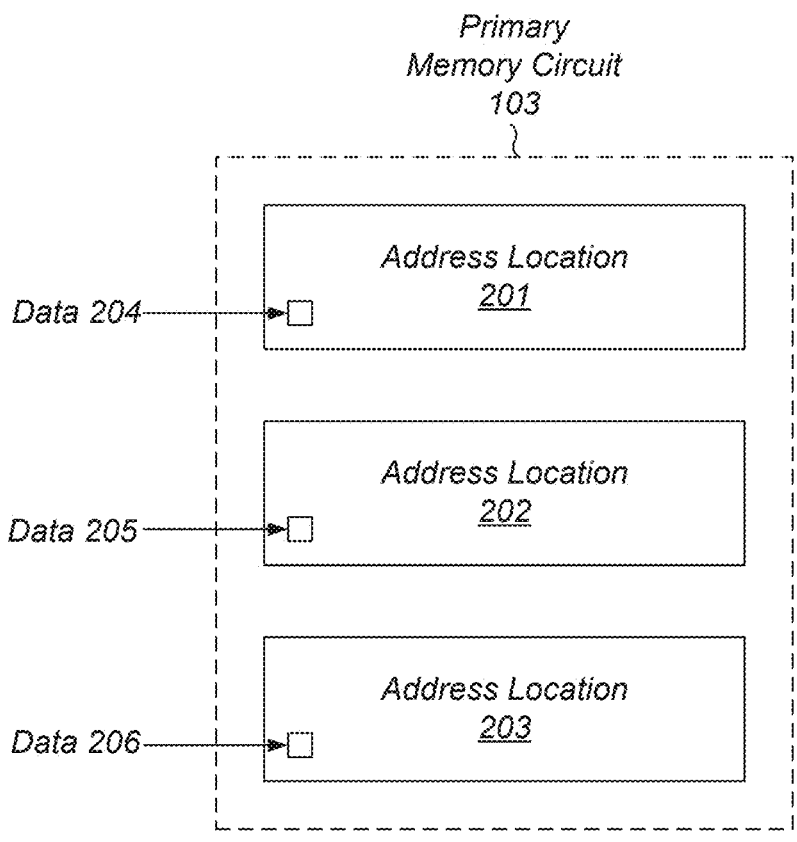
FIG. 2 is a block diagram depicting an embodiment of a main memory circuit.

Turning to FIG. 2, a block diagram of an embodiment of primary memory circuit 103 is depicted. As illustrated, primary memory circuit 103 includes address locations 201-203. In various embodiments, address locations 201-203 may correspond to ranges of addresses sufficient to store at least a portion of a sensor data stream, e.g., data stream 107A. In such cases, the ranges of addresses may correspond to groups of storage cells that are configured to operate together to store words of data. Although only three address locations are depicted in the embodiment of FIG. 2, in other embodiments, any suitable number of address locations can be included in primary memory circuit 103.

In various embodiments, data 204 is stored at address location 201, data 205 is stored at address location 202, and data 206 is stored at address location 203. Each of data 204-206 may correspond to different portions of data portions 108A and 108B. For example, data 204 may correspond to a particular data portion of data portions 108A, while data 205 may correspond to a different data portion of data portions 108B.

By storing different data portions at different address locations within primary memory circuit 103, data streams for different ones of sensors 105A-105B can be stored in a common memory circuit, allowing client circuits 106A-106B to access any data from any sensor by reading stored data from the appropriate address location. In some embodiments, data 204-206 may be raw data in that calibration and offset operations have not been performed on the data. Client circuits 106A-106B can, in different embodiments, perform calibration and offset operations as the data is retrieved from primary memory circuit 103.

As noted above, primary memory circuit 103 may be implemented using one or more DRAM circuits. In some cases, the one or more DRAM circuits may be coupled to a common communication bus that implements a given communication protocol. In other cases, the one or more DRAM circuits may be coupled to respective communication buses. In various embodiments, address locations 201-203 may be located within a single DRAM memory circuit. Alternatively, or additionally, address locations 201-203 may be located in different ones of the one or more DRAM circuits.

Figure 3:
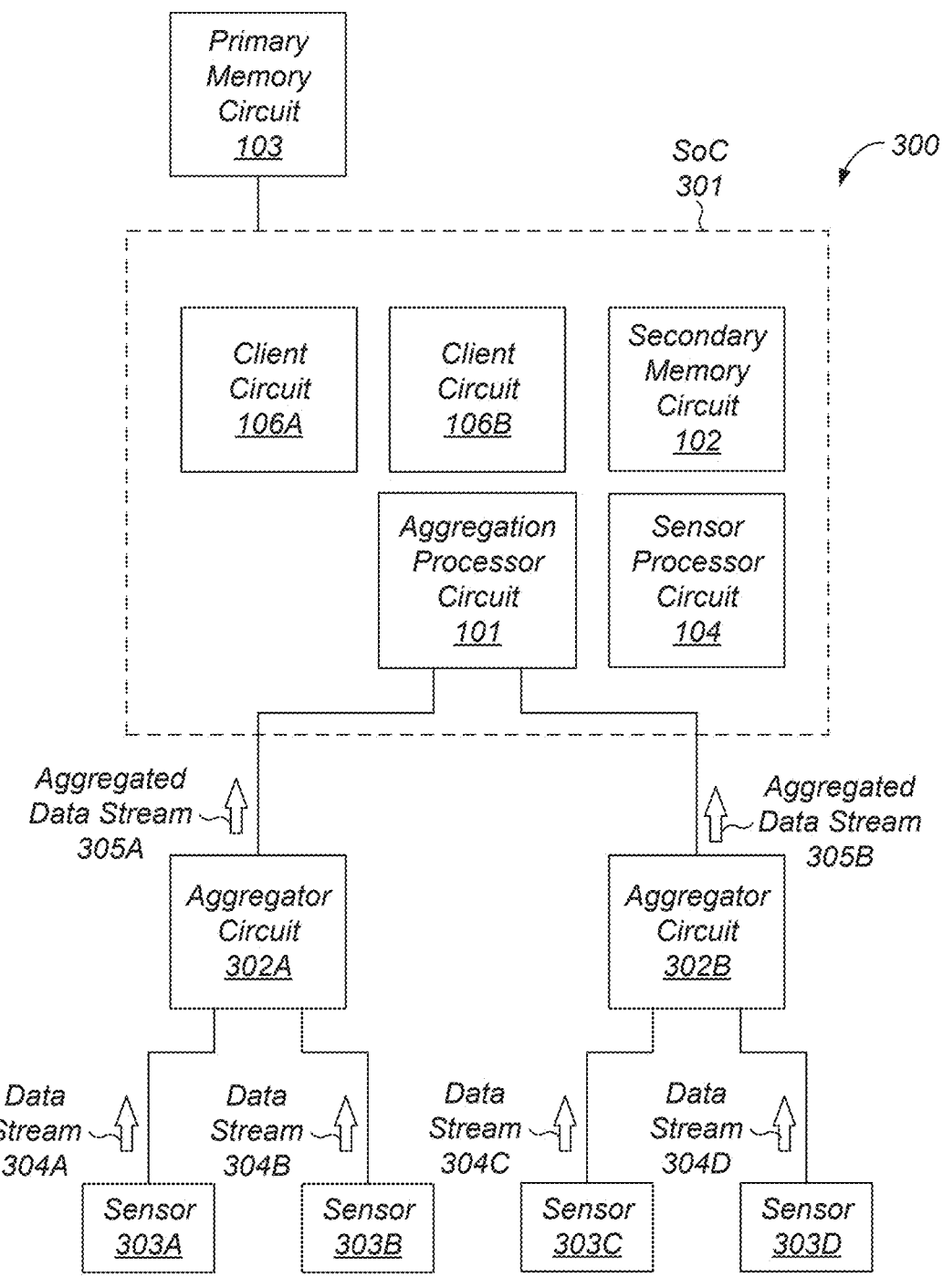
FIG. 3 is a block diagram depicting an embodiment of a computer system that employs aggregator circuits.

In some cases, aggregator circuits can be used to reduce a number of input data streams to an aggregation processor, allowing the aggregation processor to service a larger number of sensors. A block diagram of an embodiment of a computer system that employs aggregator circuits is depicted in FIG. 3. As illustrated, computer system 300 includes system-on-a-chip 301 (denoted as "SoC 301"), aggregator circuits 302A-302B, primary memory circuit 103, and sensors 303A-303D.

SoC 301 includes aggregation processor circuit 101, processor circuit 104, secondary memory circuit 102, and client circuits 106A-106B. In various embodiments, aggregation processor circuit 101, processor circuit 104, secondary memory circuit 102, and client circuits 106A-106B may be fabricated on a common integrated circuit.

Aggregator circuit 302A is configured to receive data streams 304A and 304B from sensors 303A and 303B, respectively. In a similar fashion, aggregator circuit 302B is configured to receive data streams 304C and 304D from sensors 303C and 303D, respectively. In various embodiments, aggregator circuit 302A is further configured to generate aggregated data stream 305A using data streams 304A and 304B, while aggregator circuit 302B is further configured to generate aggregated data stream 305B using data streams 304C and 304D. Although only two aggregation circuits are depicted in the embodiment of FIG. 3, in other embodiments, any suitable number of aggregator circuits can be employed.

In some embodiments, aggregator circuit 302A may be configured to receive data streams 304A and 304B using a first communication protocol, and send aggregated data stream 305A to aggregation processor circuit 101 using a second communication protocol that is different from the first communication protocol. In a similar fashion aggregator circuit 302B may be configured to receive data streams 304C and 304D using the first communication protocol, and send aggregated data stream 305B to aggregation processor circuit 101 using the second communication protocol.

Aggregation processor circuit 101 is configured to operate as described above in regard to the embodiment of FIG. 1 using aggregated data streams 305A and 305B. Although aggregation processor circuit 101 is depicted as receiving two aggregated data streams, in other embodiments, aggregation processor circuit 101 may be configured to receive any suitable number of aggregated data streams.

Sensors 303A-303D are configured to measure respective environmental conditions of computer system 300, or characteristics of a peripheral device coupled to computer system 300, and generate data streams 304A-304D, respectively. In various embodiments, any of sensors 303A-303D may correspond to either of sensors 105A or 105B.

To summarize, various embodiments of a computer system are disclosed. Broadly speaking, a plurality of sensors may be configured to generate corresponding data streams of a plurality of data streams. An aggregation processor circuit may be configured to receive the plurality of data streams, and send, at a first data rate, a first portion of a particular data stream of the plurality of data streams to a primary memory circuit. The aggregation processor circuit may be further configured to send, at a second data rate less than the first data rate, a second portion of the particular data stream to a secondary memory circuit.

Figure 4:
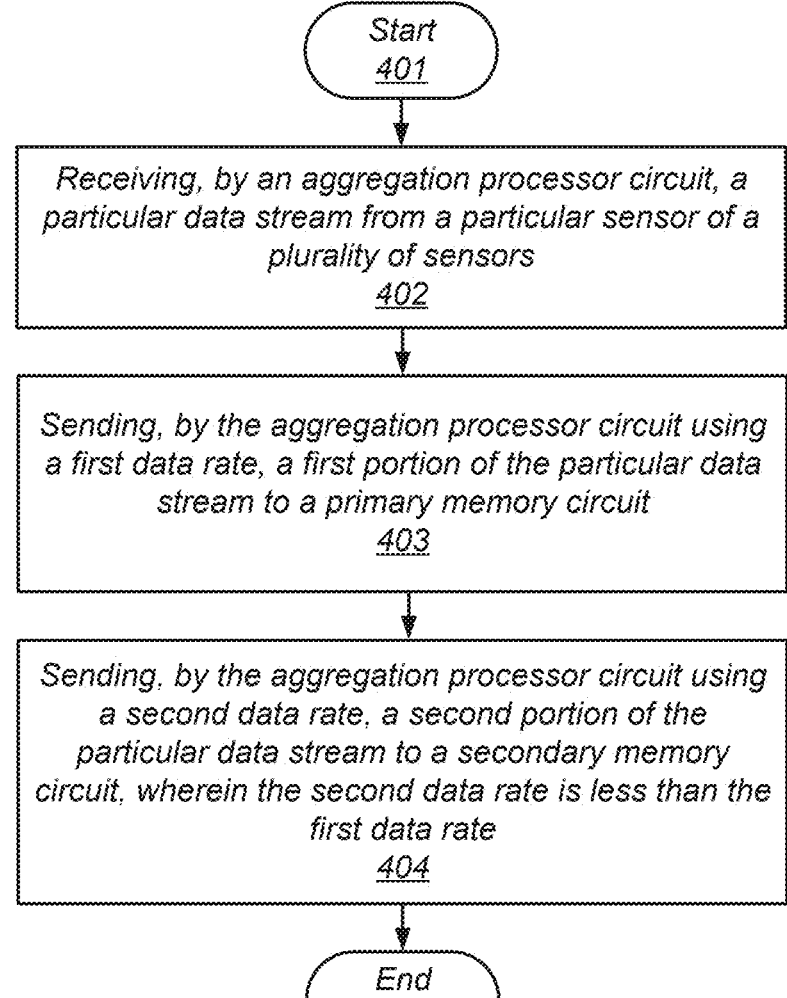
FIG. 4 is a flow diagram depicting an embodiment of a method for processing data streams from sensors in a computer system.

Turning to FIG. 4, a flow diagram depicting an embodiment of a method for processing data streams from sensors in a computer system is illustrated. The method, which may be applied to various computer systems, e.g., computer system 100 as depicted in FIG. 1, begins in block 401.

The method includes receiving, by an aggregation processor circuit, a particular data stream from a particular sensor of a plurality of sensors (block 402). In various embodiments, the particular data stream can include multiple data samples generated by the particular sensor at corresponding points of time. In other embodiments, the particular data stream may also include information that can be used to calibrate the data samples.

The method further includes sending, by the aggregation processor circuit using a first data rate, a first portion of the particular data stream to a primary memory circuit (block 403). In various embodiments, the first portion of the particular data stream may include one or more raw data samples. In some embodiments, the primary memory circuit may correspond to a main memory circuit of the computer system and may be implemented using one or more DRAM circuits.

The method also includes sending, by the aggregation processor circuit using a second data rate, a second portion of the particular data stream to a secondary memory circuit (block 404). In some embodiments, the second portion of the particular data stream may include information for calibration of the raw data samples included in the first portion of the particular data stream. In various embodiments, the secondary memory circuit may be implemented using one or more SRAM circuits. In some cases, the secondary memory circuit may be coupled to a power supply node that remains active while other power supply nodes of the computer system are deactivated as part of a sleep or hibernation mode of operation.

In various embodiments, the second data rate is less than the first data rate. In some embodiments, a first data bus connecting the aggregation processor circuit to the primary memory circuit may be wider, i.e., include a larger number of bits, than a second data bus connecting the aggregation processor circuit to the secondary memory circuit. Alternatively, or additionally, a first frequency of a first clock signal associated with transmitting data via the first data bus may be greater than a second frequency of a second clock signal associated with transmitting data via the second data bus.

In some embodiments, sending the first portion of the particular data stream to the primary memory circuit includes storing the first portion of the particular data stream at a first address location in the primary memory circuit. It is noted that the first address location may be a starting address in the case where the first portion of the particular data stream is larger than a number of bits that can be stored at a single location in the primary memory circuit.

In other embodiments, the method may further include receiving, by the aggregation processor circuit, a different data stream from a different sensor of the plurality of sensors. The method may additionally include sending, by the aggregation processor circuit using the first data rate, a third portion of the different data stream to the primary memory circuit, and sending, by the aggregation processor circuit using the second data rate, a fourth portion of the different data stream to the secondary memory circuit. The method concludes in block 405.

Figure 5:
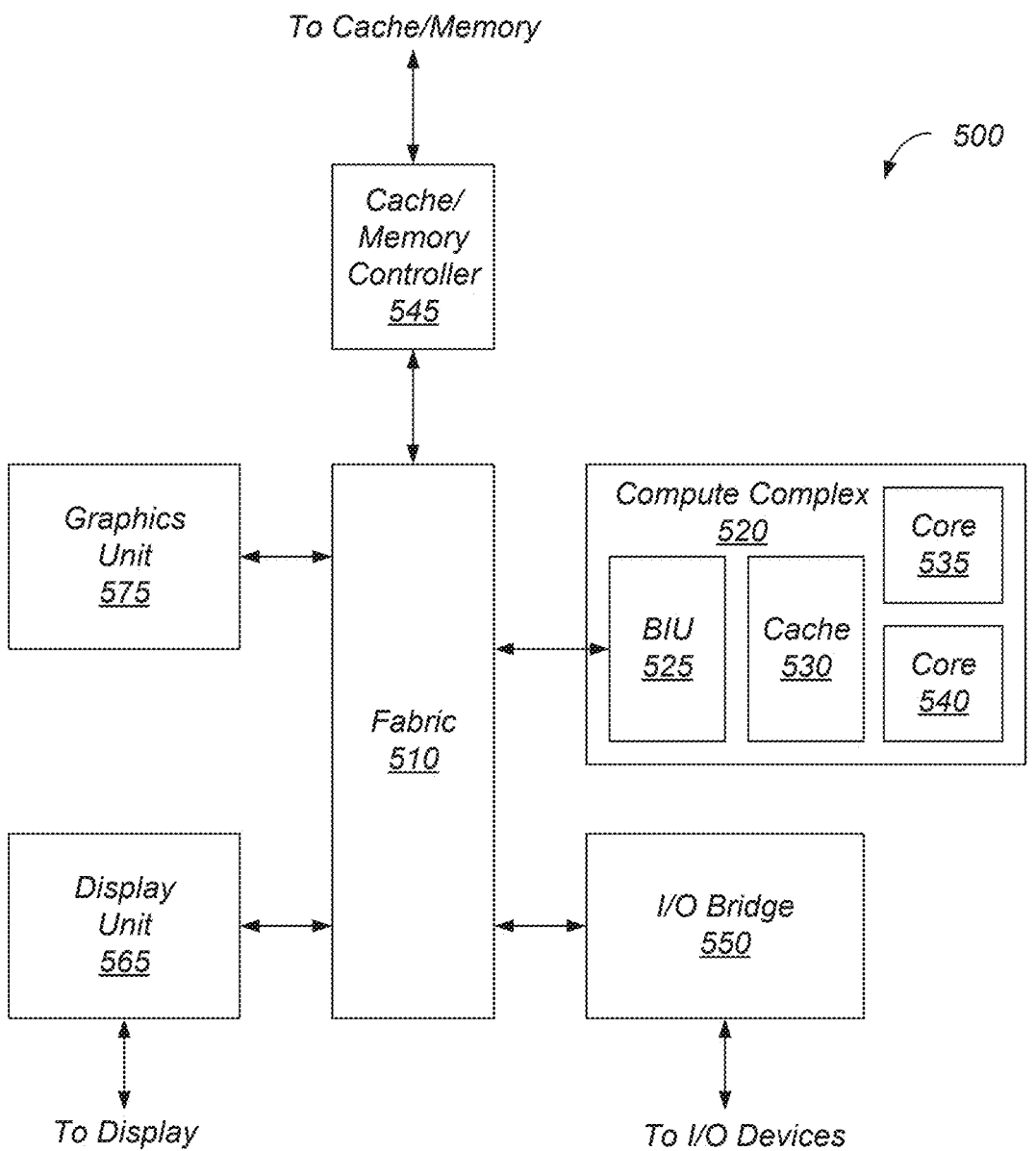
FIG. 5 is a block diagram of an embodiment of a device that includes sensors.

Referring now to FIG. 5, a block diagram illustrating an example embodiment of a device that may include aggregator circuits and an aggregation processor is shown. In various embodiments, device 500 may implement functionality of aggregation processor circuit 101 as depicted in FIG. 1. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 550, cache/memory controller 545, graphics unit 575, and display unit 565. In some embodiments, device 500 may include other components (not shown) in addition to, or in place of, the illustrated components, such as video processor encoders and decoders, image processing or recognition elements, computer vision elements, etc.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol, and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores, and caches. For example, compute complex 520 may include 1, 2, or 4 processor cores, or any other suitable number. In one embodiment, cache 530 is a set associative L2 cache. In some embodiments, cores 535 and 540 may include internal instruction and data caches. In some embodiments, a coherency unit (not shown) in fabric 510, cache 530, or elsewhere in device 500, may be configured to maintain coherency between various caches of device 500. BIU 525 may be configured to manage communication between compute complex 520 and other elements of device 500. Processor cores, such as cores 535 and 540, may be configured to execute instructions of a particular instruction set architecture (ISA) which may include operating system instructions and user application instructions. These instructions may be stored in a computer readable medium such as a memory coupled to cache memory controller 545 as discussed below.

As used herein, the term "coupled to" may indicate one or more connections between elements, and a coupling may include intervening elements. For example, in FIG. 5, graphics unit 575 may be described as "coupled to" a memory through fabric 510 and cache/memory controller 545. In contrast, in the illustrated embodiment of FIG. 5, graphics unit 575 is "directly coupled" to fabric 510 because there are no intervening elements.

Cache/memory controller 545 may be configured to manage transfer of data between fabric 510 and one or more caches and memories. For example, cache/memory controller 545 may be coupled to an L3 cache, which may, in turn, be coupled to a system memory. In other embodiments, cache/memory controller 545 may be directly coupled to a memory. In some embodiments, cache/memory controller 545 may include one or more internal caches. Memory coupled to cache/memory controller 545 may be any type of volatile memory, such as dynamic random access memory (DRAM), synchronous DRAM (SDRAM), double data rate (DDR, DDR2, DDR3, etc.) SDRAM (including mobile versions of SDRAMs such as mDDR3, etc., and/or low power versions of SDRAMs such as LPDDR4, etc.), RAM-BUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to cache/memory controller 545 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 520 to cause the computing device to perform functionality described herein.

Graphics unit 575 may include one or more processors, e.g., one or more graphics processing units (GPUs). Graphics unit 575 may receive graphics-oriented instructions, such as OPENGL®, Metal®, or DIRECT3D® instructions, for example. Graphics unit 575 may execute specialized GPU instructions or perform other operations based on the received graphics-oriented instructions. Graphics unit 575 may generally be configured to process large blocks of data in parallel, and may build images in a frame buffer for output to a display, which may be included in the device or may be a separate device. Graphics unit 575 may include transform, lighting, triangle, and rendering engines in one or more graphics processing pipelines. Graphics unit 575 may output pixel information for display images. Graphics unit 575, in various embodiments, may include programmable shader circuitry which may include highly parallel execution cores configured to execute graphics programs, which may include pixel tasks, vertex tasks, and compute tasks (which may or may not be graphics-related).

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (cDP)) for coupling to a user display (e.g., a touchscreen or an external display).

I/O bridge 550 may include various elements configured to implement universal serial bus (USB) communications, security, audio, and low-power always-on functionality, for example. I/O bridge 550 may also include interfaces such as pulse-width modulation (PWM), general-purpose input/output (GPIO), serial peripheral interface (SPI), and inter-integrated circuit (I2C), for example. Various types of peripherals and devices may be coupled to device 500 via I/O bridge 550.

In some embodiments, device 500 includes network interface circuitry (not explicitly shown), which may be connected to fabric 510 or I/O bridge 550. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 500 with connectivity to various types of other devices and networks.

Figure 6:
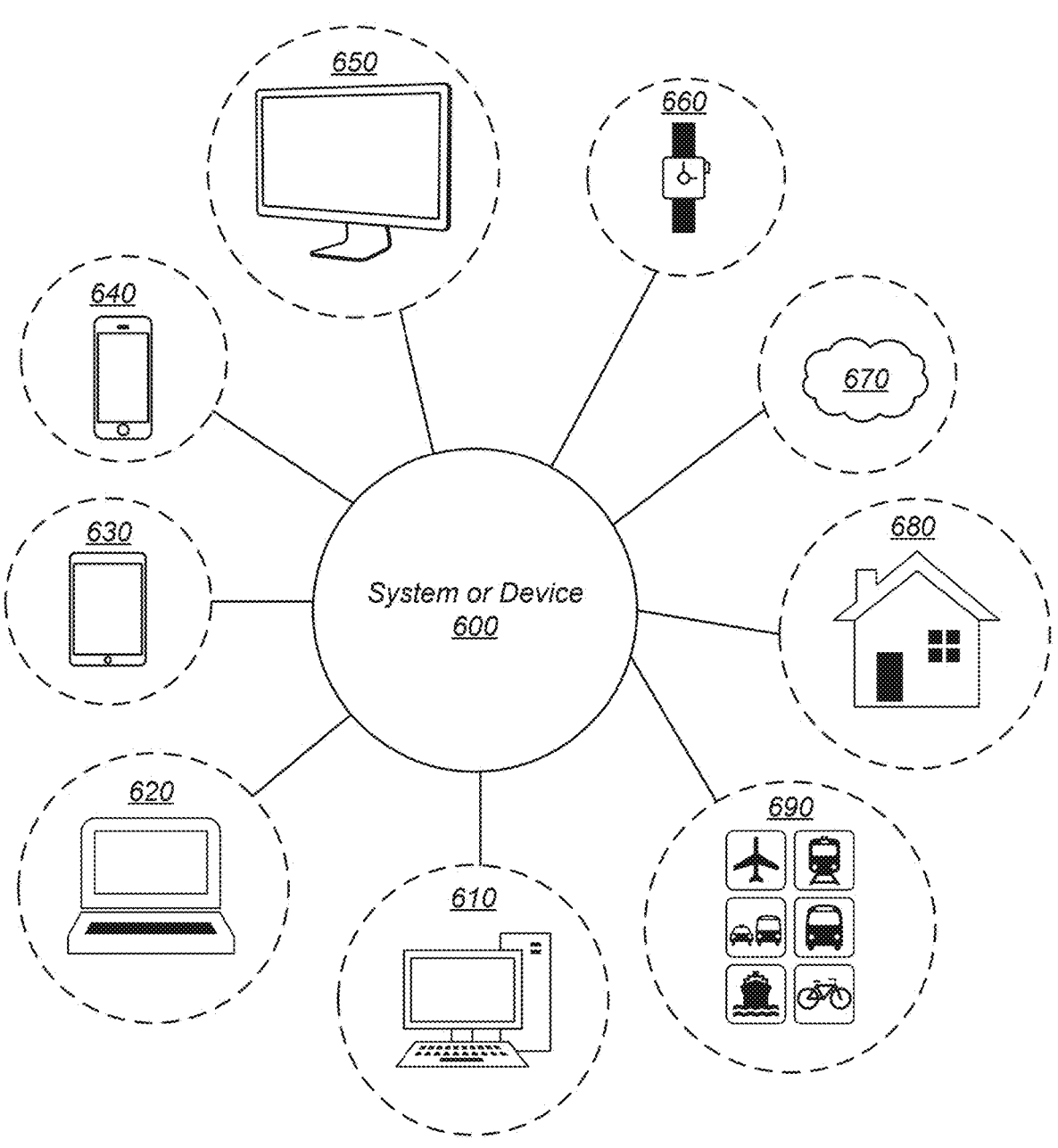
FIG. 6 is a block diagram of various embodiments of computer systems that may include sensors.

Turning now to FIG. 6, various types of systems that may include any of the circuits, devices, or systems discussed above are illustrated. System or device 600, which may incorporate or otherwise utilize one or more of the techniques described herein, may be utilized in a wide range of areas. For example, system or device 600 may be utilized as part of the hardware of systems such as a desktop computer 610, laptop computer 620, tablet computer 630, cellular or mobile phone 640, or television 650 (or set-top box coupled to a television).

Similarly, disclosed elements may be utilized in a wearable device 660, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 600 may also be used in various other contexts. For example, system or device 600 may be utilized in the context of a server computer system, such as a dedicated server or on shared hardware that implements a cloud-based service 670. Still further, system or device 600 may be implemented in a wide range of specialized everyday devices, including devices 680 commonly found in the home such as refrigerators, thermostats, security cameras, etc. The interconnection of such devices is often referred to as the "Internet of Things" (IoT). Elements may also be implemented in various modes of transportation. For example, system or device 600 could be employed in the control systems, guidance systems, entertainment systems, etc. of various types of vehicles 690.

The applications illustrated in FIG. 6 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as design simulation, design synthesis, circuit fabrication, etc.

Figure 7:
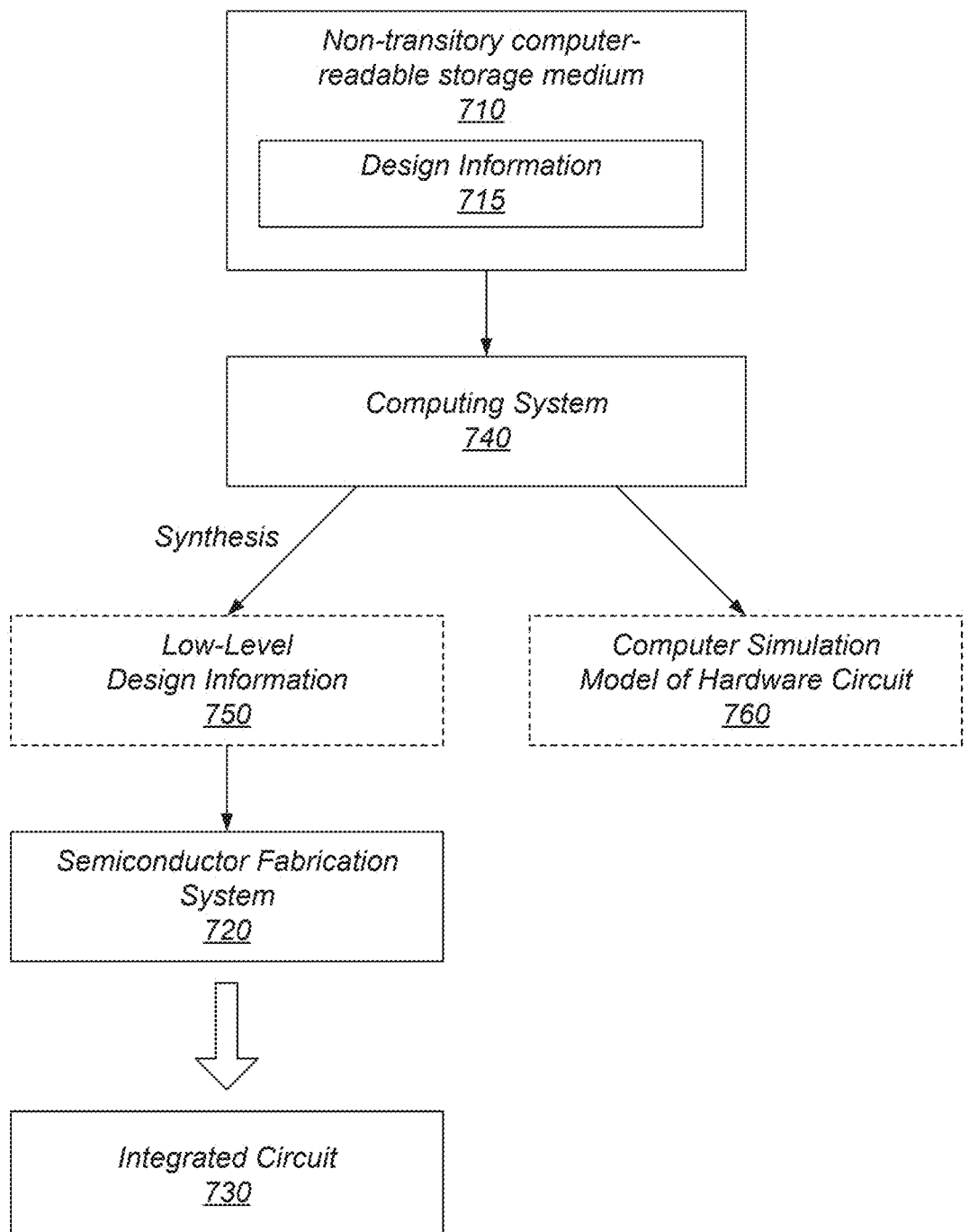
FIG. 7 illustrates an example of a non-transitory computer-readable storage medium that stores circuit design information.

FIG. 7 is a block diagram illustrating an example of a non-transitory computer-readable storage medium that stores design information 715, according to some embodiments. In the illustrated embodiment, computing system 740 is configured to process design information 715. This may include executing instructions included in design information 715, interpreting instructions included in design information 715, compiling, transforming, or otherwise updating design information 715, etc. Therefore, design information 715 controls computing system 740 (e.g., by programming computing system 740) to perform various operations discussed below, in some embodiments.

In the illustrated example, computing system 740 processes design information 715 to generate both computer simulation model of hardware circuit 760 and low-level design information 750. In other embodiments, computing system 740 may generate only one of these outputs, may generate other outputs based on design information 715, or both. Regarding computer simulation model of hardware circuit 760, computing system 740 may execute instructions of a hardware description language that includes register transfer level (RTL) code, behavioral code, structural code, or some combination thereof. The simulation model may perform the functionality specified by design information 715, facilitate verification of the functional correctness of the hardware design, generate power consumption estimates, generate timing estimates, etc.

In the illustrated example, computing system 740 also processes design information 715 to generate low-level design information 750 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on low-level design information 750 (potentially among other inputs), semiconductor fabrication system 720 is configured to fabricate integrated circuit 730 (which may correspond to functionality of the computer simulation model of hardware circuit 760). Note that computing system 740 may generate different simulation models based on design information at various levels of description, including low-level design information 750, design information 715, and so on. The data representing low-level design information 750 and computer simulation model of hardware circuit 760 may be stored on non-transitory computer-readable storage medium 710, or on one or more other media.

In some embodiments, low-level design information 750 controls (e.g., programs) semiconductor fabrication system 720 to fabricate integrated circuit 730. Thus, when processed by the fabrication system, the design information may program the fabrication system to fabricate a circuit that includes various circuitry disclosed herein.

Non-transitory computer-readable storage medium 710 may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash memory, magnetic media, e.g., a hard drive, or optical storage; registers, or other similar types of memory elements, etc. Non-transitory computer-readable storage medium 710 may include other types of non-transitory memory as well, or combinations thereof. Accordingly, non-transitory computer-readable storage medium 710 may include two or more memory media, which may reside in different locations for example, in different computer systems that are connected over a network.

Design information 715 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 740, semiconductor fabrication system 720, or both. In some embodiments, design information 715 may also include one or more cell libraries that specify the synthesis, layout, or both of integrated circuit 730. In some embodiments, design information 715 is specified in whole, or in part, in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 and computer simulation model of hardware circuit 760 are configured to operate according to a circuit design specified by design information 715, which may include performing any of the functionality described herein. For example, integrated circuit 730 may include any of various elements shown in FIGS. 1-3. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model does not imply that the instructions must be executed in order for the element to be met, but rather, specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by design information 715. The different circuit implementations may affect the performance, area, power consumption, etc. of a given design (potentially with tradeoffs between different design goals), but the logical function does not vary among the different circuit implementations of the same circuit design.

In some embodiments, the instructions included in design information 715 provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information included in low-level design information 750. Low-level design information 750 may program semiconductor fabrication system 720 to fabricate integrated circuit 730.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third," when applied to a feature, do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors, or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, a circuit, or a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), a functional unit, a memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as a structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits, or portions thereof, may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a primary memory circuit;
a secondary memory circuit;
a plurality of sensors configured to generate corresponding data streams of a plurality of data streams; and
an aggregation processor circuit configured to:
  receive the plurality of data streams;
  send, at a first data rate, a first portion of a plurality of portions of a first data stream of the plurality of data streams to the primary memory circuit;
  send, at a second data rate less than the first data rate, a second portion of the plurality of portions to the secondary memory circuit;
  store the first portion of the plurality of portions at a first address location in the primary memory circuit, wherein the first portion corresponds to a first sensor of the plurality of sensors; and
  store a third portion of the plurality of portions at a second address location in the primary memory circuit, wherein the third portion corresponds to a second sensor of the plurality of sensors.

2. The apparatus of claim 1, further comprising a sensor processor circuit configured to:
retrieve the second portion from the secondary memory circuit;
determine calibration and offset information using the second portion; and
store the calibration and offset information at a third address location in the primary memory circuit.

3. The apparatus of claim 2, wherein the sensor processor circuit is further configured to send one or more instructions to the aggregation processor circuit.

4. The apparatus of claim 2, further comprising a client circuit configured to:
retrieve raw data associated with a particular sensor of the plurality of sensors from the primary memory circuit;
retrieve offset and calibration information associated with the particular sensor from the primary memory circuit; and

apply the offset and calibration information to the raw data to generate calibrated data.

5. The apparatus of claim 2, wherein the first portion of the plurality of portions of data includes raw data from the first sensor, and wherein the second portion of the plurality of portions includes information for calibration.

6. The apparatus of claim 3, wherein the aggregation processor circuit is further configured to relay at least one instruction of the one or more instructions to at least one sensor of the plurality of sensors.

7. A method, comprising:
receiving, by an aggregation processor circuit, a particular data stream from a particular sensor of a plurality of sensors;
sending, by the aggregation processor circuit using a first data rate, a first portion of the particular data stream to a primary memory circuit;
storing the first portion of the particular data stream at a first address location in the primary memory circuit;
sending, by the aggregation processor circuit using a second data rate, a second portion of the particular data stream to a secondary memory circuit, wherein the second data rate is less than the first data rate;
retrieving, by a sensor processor circuit, the second portion of the particular data stream from the secondary memory circuit;
determining, by the sensor processor circuit, calibration and offset information using the second portion of the particular data stream; and
storing, by the sensor processor circuit, the calibration and offset information at a second address location in the primary memory circuit.

8. The method of claim 7, wherein the first portion of the particular data stream includes raw data from the particular sensor, and wherein the second portion of the particular data stream includes information for calibration.

9. The method of claim 7, further comprising:
retrieving, by a client circuit, the first portion of the particular data stream from the primary memory circuit;
retrieving, by the client circuit, the calibration and offset information from the primary memory circuit; and
generating, by the client circuit, calibrated data using the first portion of the particular data stream and the calibration and offset information.

10. The method of claim 9, further comprising:
receiving, by the sensor processor circuit, a request for a particular data rate from the client circuit; and
generating, by the sensor processor circuit, setup information using the request.

11. The method of claim 7, further comprising:
receiving, by the aggregation processor circuit, a different data stream from a different sensor of the plurality of sensors;
sending, by the aggregation processor circuit using the first data rate, a third portion of the different data stream to the primary memory circuit; and
sending, by the aggregation processor circuit using the second data rate, a fourth portion of the different data stream to the secondary memory circuit.

12. The method of claim 7, further comprising sending, by the sensor processor circuit, at least one instruction to the aggregation processor circuit.

13. The method of claim 12, further comprising relaying, by the aggregation processor circuit, the at least one instruction to at least one sensor of the plurality of sensors.

14. A system, comprising:

a main memory circuit;

a system-on-a-chip that includes a plurality of client circuits, an aggregation processor circuit, and a secondary memory circuit;

a plurality of sensors configured to generate corresponding data streams of a plurality of data streams; and a plurality of aggregator circuits configured to:

combine respective data streams for corresponding subsets of the plurality of sensors to generate corresponding composite data streams of a plurality of composite data streams;

relay the plurality of composite data streams for the aggregation processor circuit; and wherein the aggregation processor circuit is configured to:

send, at a first data rate, a first portion of a particular composite data stream of the plurality of composite data streams to the main memory circuit, wherein the first portion of the particular composite data stream includes raw sensor data; and send, at a second data rate less than the first data rate, a second portion of the particular composite data stream to the secondary memory circuit, wherein the second portion of the particular composite data stream includes information for calibration.

15. The system of claim 14, wherein the aggregation processor circuit is further configured to store the first portion starting at a first address location in the main memory circuit.

16. The system of claim 15, wherein the system-on-a-chip further includes a sensor processor circuit configured to:

retrieve the second portion from the secondary memory circuit;

determine calibration and offset information using the second portion; and store the offset and calibration information starting at a second address location in the main memory circuit.

17. The system of claim 16, wherein the sensor processor circuit is further configured to send at least one instruction to the aggregation processor circuit.

18. The system of claim 17, wherein the aggregation processor circuit is further configured to relay at least one instruction to at least one sensor of the plurality of sensors.

19. The system of claim 16, wherein a particular client circuit of the plurality of client circuits is configured to:

retrieve the first portion from the main memory circuit;

retrieve the calibration and offset information from the main memory circuit; and generate calibrated data using the first portion of the particular composite data stream and the calibration and offset information.

20. The system of claim 16, wherein the aggregation processor circuit is further configured to send, at the first data rate, a third portion of a different composite data stream of the plurality of composite data streams to the main memory circuit; and send, at the second data rate, a fourth portion of the different composite data stream to the secondary memory circuit.

* * * * *